(12) United States Patent
Ahad

(10) Patent No.: US 7,410,127 B1
(45) Date of Patent: Aug. 12, 2008

(54) SEAT TRACK ANTI-RATTLE LOCKING DEVICE

(75) Inventor: Sam J. Ahad, Newhall, CA (US)

(73) Assignee: Timco Aviation Services, Inc., Greensboro, NC (US)

( * ) Notice: Subject to any disclaimer, the term of this patent is extended or adjusted under 35 U.S.C. 154(b) by 62 days.

(21) Appl. No.: 10/883,580

(22) Filed: Jul. 1, 2004

(51) Int. Cl.
*B64D 11/00* (2006.01)

(52) U.S. Cl. ............ 244/118.5; 244/118.6; 244/122 R; 410/104; 410/105; 297/257; 297/130

(58) Field of Classification Search .............. 244/118.5, 244/118.6, 122 R; 410/104, 105; 297/257, 297/130

See application file for complete search history.

(56) References Cited

U.S. PATENT DOCUMENTS

| | | | |
|---|---|---|---|
| 3,102,754 A | 9/1963 | Junkunc .................... 297/162 |
| 3,145,052 A | 8/1964 | Morgan ...................... 297/354 |
| 3,392,954 A | 7/1968 | Malitte ....................... 248/429 |
| 3,730,019 A | 5/1973 | Ballard ........................ 74/502 |
| 4,215,841 A * | 8/1980 | Herring, Jr. ................. 248/635 |
| 4,354,398 A | 10/1982 | Porter ......................... 74/501 |
| 4,634,182 A | 1/1987 | Tanaka ....................... 297/379 |
| 4,662,676 A | 5/1987 | Havelock .................... 297/194 |
| 4,796,837 A * | 1/1989 | Dowd ..................... 244/122 R |
| 4,887,864 A | 12/1989 | Ashton ....................... 297/375 |
| 4,944,552 A | 7/1990 | Harris ........................ 297/145 |
| 5,029,822 A | 7/1991 | Selzer ..................... 267/64.12 |
| 5,058,829 A | 10/1991 | Bentley ....................... 244/122 |
| D333,420 S | 2/1993 | Bales et al. .................. D8/349 |
| 5,449,132 A | 9/1995 | Gilbert ....................... 244/122 |
| 5,451,092 A | 9/1995 | Gray ........................... 297/122 |
| 5,553,923 A | 9/1996 | Bilezikjian ............... 297/452.2 |
| 5,558,391 A | 9/1996 | Chavous ..................... 297/153 |
| 5,651,587 A | 7/1997 | Kodaverdian .......... 297/423.36 |
| 5,722,722 A | 3/1998 | Massara ................ 297/216.13 |
| 5,762,296 A | 6/1998 | Gilbert .................... 244/118.1 |
| 5,765,911 A | 6/1998 | Sorenson ..................... 297/173 |
| 5,794,470 A | 8/1998 | Stringer ....................... 70/261 |
| 5,806,932 A | 9/1998 | Zhuang ................... 297/361.1 |
| 5,871,259 A | 2/1999 | Gehart .................... 297/362.12 |
| 5,871,318 A | 2/1999 | Dixon et al. ................ 410/105 |
| 5,890,765 A | 4/1999 | LaPointe et al. ........ 297/354.13 |
| 6,003,394 A | 12/1999 | Heckel, Jr. ................. 74/89.15 |
| 6,019,429 A | 2/2000 | Tedesco ...................... 297/328 |
| 6,086,155 A | 7/2000 | Stiffler ....................... 297/362 |
| 6,106,067 A | 8/2000 | Zhuang et al. ........... 297/361.1 |
| 6,279,416 B1 | 8/2001 | Bucholtz et al. ........... 74/501.5 |
| 6,669,295 B2 | 12/2003 | Williamson ............ 297/362.13 |
| 6,793,282 B2 | 9/2004 | Plant et al. .................. 297/248 |
| 6,799,805 B2 | 10/2004 | Johnson ................... 297/452.2 |
| 2004/0145225 A1 | 7/2004 | Alter ........................... 297/367 |

* cited by examiner

*Primary Examiner*—J. Woodrow Eldred
(74) *Attorney, Agent, or Firm*—MacCord Mason PLLC

(57) ABSTRACT

An improved seating apparatus for an aircraft comprising: a seat assembly; and a wedge lock device for securing the seat assembly to the aircraft without any rattle. In the preferred embodiment, the wedge lock device includes: a selectively adjustable force applicator for applying force to a force bearer; a force bearer for transferring force to an aircraft seat track; and a stud connected to the seat assembly. Also in the preferred embodiment, the seat assembly includes a seat leg.

40 Claims, 3 Drawing Sheets

SEAT TRACK ANTI-RATTLE LOCKING DEVICE

BACKGROUND OF THE INVENTION (1) Field of the Invention

The present invention relates generally to aircraft seating and, more particularly, to a wedge lock anti-rattle apparatus for securing a seat assembly to an aircraft.

(2) Description of the Prior Art

Commercial aircraft passenger seats are retained on the aircraft floor by a standardized set of slotted tracks and mating locking devices at the front and rear of the seat legs. The locking devices must allow quick installation and removal of the seats, yet securely hold them in place without any "play" or rattle.

Due to interference with the aircraft carpeting and the seat mounting tracks, it is sometimes difficult to fully tighten the locking devices, resulting in loose seat installations or damaged parts. Also, special tools are often required to install or remove the fittings from the mounting tracks.

Traditionally, the front seat track locking device consisted of a threaded stud with a flat nylon washer, a threaded hexagonal or tabbed anti-rattle washer, flat washers and a self-locking nut that attach it to a bracket which is in-turn attached to the front of the seat leg assembly. A special tool is required to tighten or loosen the anti-rattle washer and sometimes interference from carpeting or the mounting track itself prevents the anti-rattle washer from being properly tightened.

Thus, there remains a need for a new and improved aircraft seat track anti-rattle locking device that requires no special tools to tighten, while, at the same time, secures the seat firmly to the seat track so that the seat remains secured without any play.

SUMMARY OF THE INVENTION

The present invention is directed to an improved seating apparatus for an aircraft comprising: a seat assembly; and a wedge lock device for securing the seat assembly to the aircraft. In the preferred embodiment, the wedge lock device includes: a selectively adjustable force applicator for applying force to a force bearer; a force bearer for transferring force to an aircraft seat track; and a stud connected to the seat assembly. Also in the preferred embodiment, the seat assembly includes a seat leg.

In the preferred embodiment, the force applicator may include a rod. The rod may include threads. The threaded rod may be a setscrew. The force bearer may include a plate. The force bearer may include a flexible pad. The seating apparatus may further include a seat track for engaging the stud. The track may include a top, bottom, and at least one side defining a slot for retaining the stud. The top of the track may include opposing edges generally parallel to the sides of the track. The distance between the opposing edges may change along at least a portion of the track. The stud may extend trackwardly from the seat assembly. The stud may include a head portion. The stud may include a collar portion. The head portion of the stud may be larger than the collar portion of the stud measured transverse the trackward extension of the stud.

In the preferred embodiment, the seat assembly may include a seat back. The seat assembly may include an armrest. The seat assembly may include a headrest. The seat assembly may include a serving tray. The seat assembly may include seat controls. The seat controls may include seat recline control.

Accordingly, one aspect of the present invention is to provide an improved seating apparatus for an aircraft comprising: a seat assembly; and a wedge lock device for securing the seat assembly to the aircraft.

Another aspect of the present invention is to provide a wedge lock apparatus for securing a seat assembly to an aircraft, the wedge lock apparatus comprising: a force applicator; a force bearer; a stud connected to the seat assembly; and a track for engaging the stud.

Still another aspect of the present invention is to provide an improved seating apparatus for an aircraft comprising: a seat assembly including a seat leg; and a wedge lock device for securing the seat assembly to the aircraft including: a selectively adjustable force applicator for applying force to a force bearer; a force bearer for transferring force to an aircraft seat track; and a stud connected to the seat assembly.

These and other aspects of the present invention will become apparent to those skilled in the art after a reading of the following description of the preferred embodiment when considered with the drawings.

DESCRIPTION OF THE PREFERRED EMBODIMENTS

Figure 1:
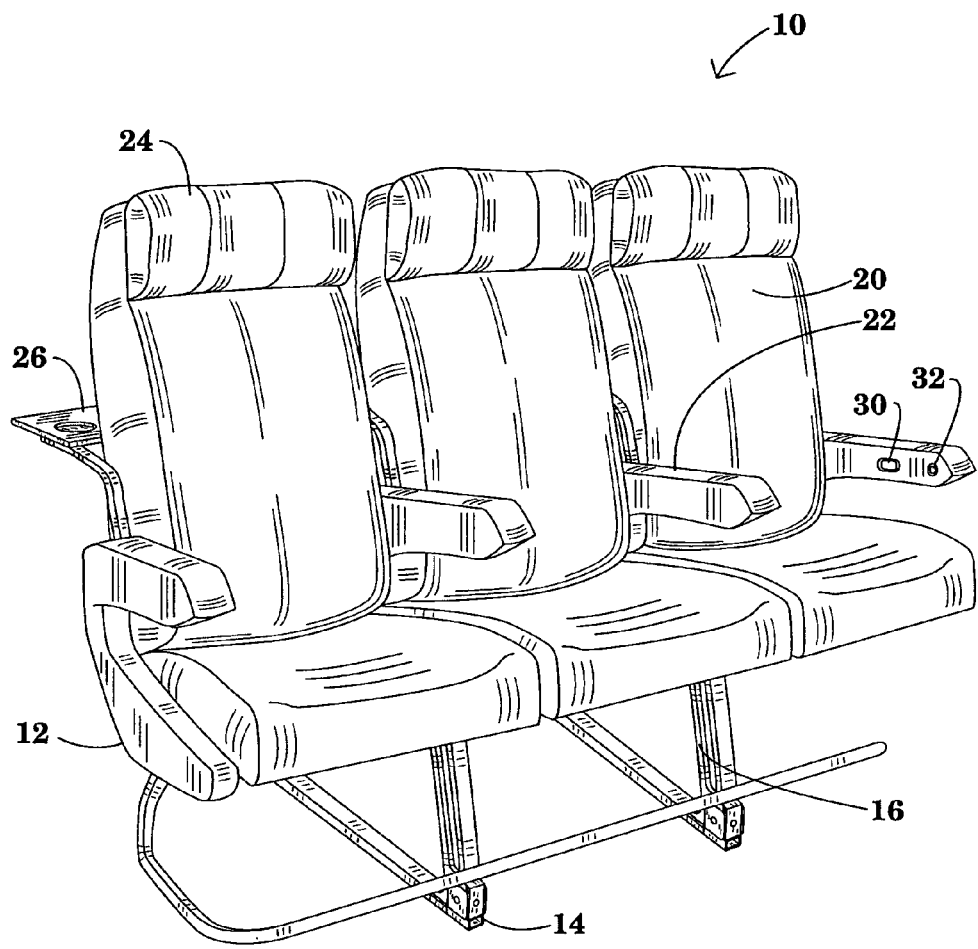
FIG. 1 is a perspective view of an improved seating apparatus for an aircraft constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, the illustrations are for the purpose of describing a preferred embodiment of the invention and are not intended to limit the invention thereto. As best seen in FIG. 1, an improved seating apparatus for an aircraft, generally designated 10, is shown constructed according to the present invention. The improved seating apparatus 10 includes a seat assembly 12 and a wedge lock device 14 for securing the seat assembly to an aircraft. The seat assembly 12 includes a seat leg 16, a seat back 20, an armrest 22, a headrest 24, a serving tray 26, and seat controls 30. The seat controls include a seat recline control 32.

Figure 2:
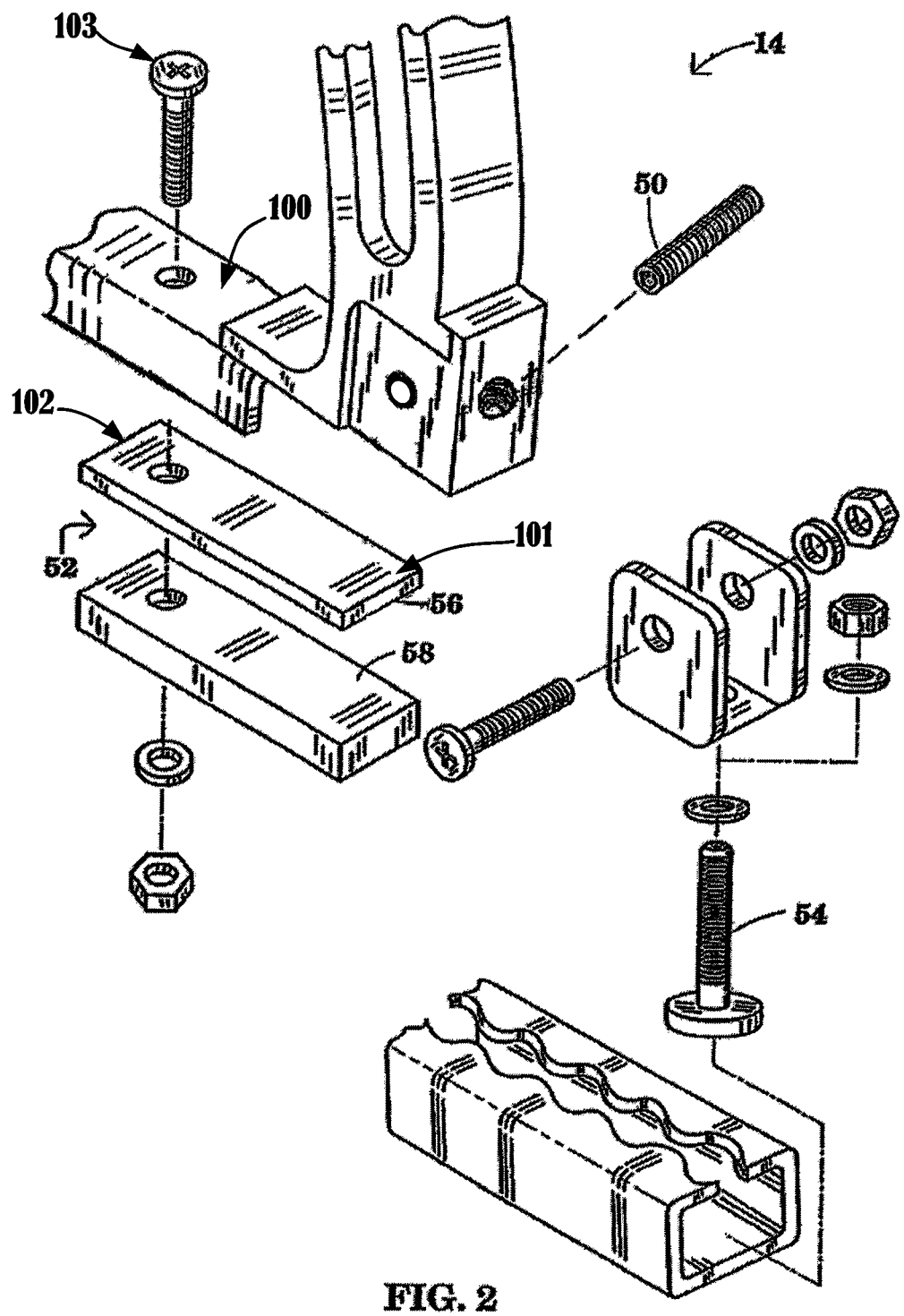
FIG. 2 is an enlarged cross-sectional perspective view of a wedge lock device for securing a seat assembly to an aircraft.

FIG. 2 shows a wedge lock device 14 for securing the seat assembly 12 to an aircraft. The wedge lock device includes a selectively adjustable force applicator 50 for applying force to a force bearer, a force bearer 52 for transferring force to an aircraft seat track, and a stud 54 connected to the seat assembly. The force applicator 50 is a setscrew, which includes a rod and threads on the surface of the rod. The force bearer 52 includes a plate 56 with non-bolted end 101 and bolted end 102, and a flexible pad 58. Force bearer bolt 103 secures bolted end 102 and flexible pad 58 to track sleeve 100.

Figure 3:
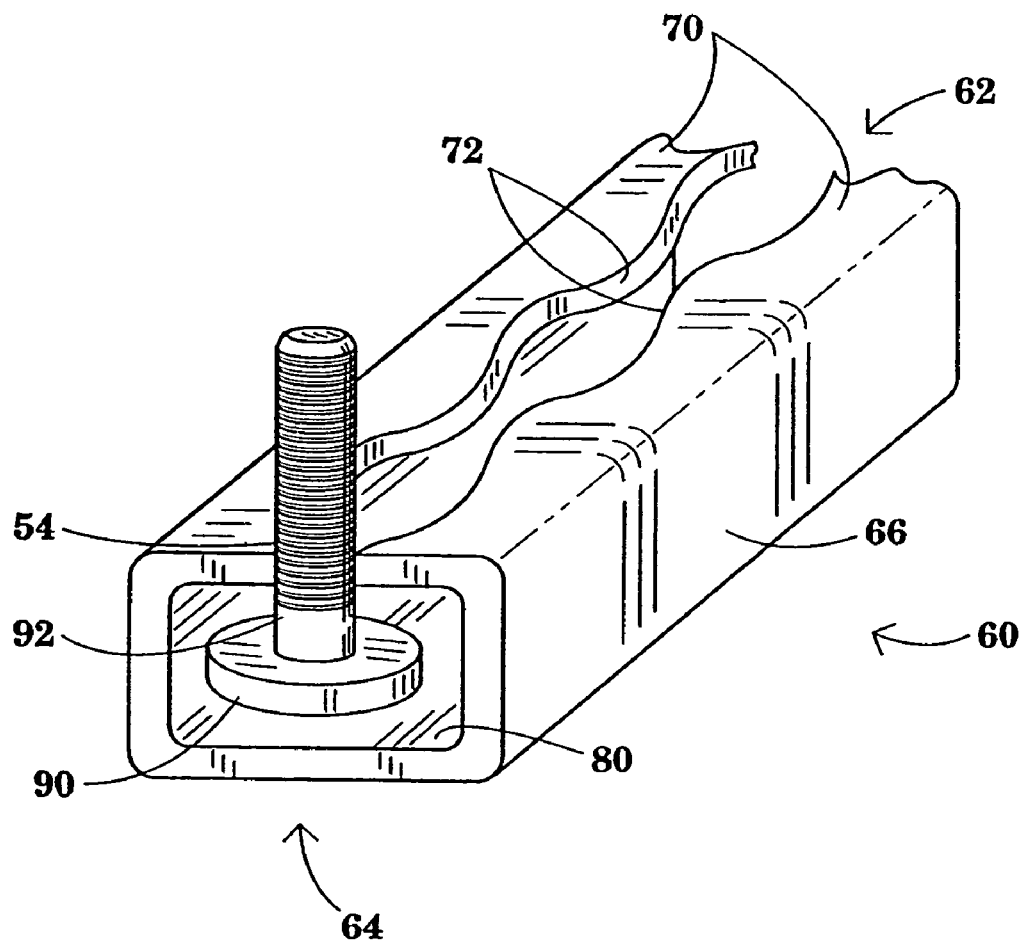
FIG. 3 is an enlarged end view of a track and stud for a wedge lock device for securing a seat assembly to an aircraft.

FIG. 3 is an enlarged cross-sectional perspective view of a track 60 and stud 54 of the wedge lock device 14. The track includes a top 62, bottom 64, and at least one side 66 defining a slot for retaining the stud. The top 62 of the track 60 includes two opposing sections 70 extending from the sides 66 of the track 60. The top 62 of the track 60 includes opposing edges 72 generally parallel to the sides 66 of the track 60. The distance between the opposing edges changes along at least a portion of the track.

The stud 54 extends trackwardly from the seat assembly 12, and includes a head portion 90 and a collar portion 92. The head portion of the stud 54 is larger than the collar portion of the stud 54, measured transverse the trackward extension of the stud 54.

In operation, the setscrew 50, when tightened, applies downward force to non-bolted end 101 of plate 56. Non-bolted end 101 moves downward but bolted end 102 does not as it is secured to track sleeve 100 by force bearer bolt 103. In this respect plate 56 is bendable and capable of deflection in response to pressure from force applicator 50. Tightening the setscrew moves the force bearer 52 downward, which also exerts force on the seat track 60. This force moves the seat assembly 12 upward, away from the seat track 60. The stud 54, being connected to the seat assembly 12 on one end and having a head portion 90 within the track 60, is forced upward to the bottom surface of the top of the track 60. The resulting friction from the upward force of the stud 54 against the bottom surface of the top 62 of the track 60 clamps the seat assembly 12 in a desired position along the track 60. This design eliminates movement or "play" of the stud 54 in the up or down direction and thus there is no resulting rattle.

Certain modifications and improvements will occur to those skilled in the art upon a reading of the foregoing description. By way of example, the force applicator 50 can be a standard screw or bolt at different angles, including the vertical. The force bearer 52 can be a different shape and design, including round discs attached to the force applicator 50. Also, the force applicator can be replaced with a cammed lever. A cammed lever can replace any screw 50, with a pivoted lever handle with a cam shape at the force bearer side. All such modifications and improvements have been deleted herein for the sake of conciseness and readability but are properly within the scope of the following claims.

I claim:

1. An improved seating apparatus for an aircraft comprising:
    (a) a seat track;
    (b) a seat assembly; and
    (c) a wedge lock device located between the seat track and the seat assembly including a bendable force bearer having a plate attached at one end of the plate for engaging the upper surface of the seat track to secure the seat assembly to the aircraft.

2. The apparatus according to claim 1, wherein the seat assembly includes a seat leg.

3. The apparatus according to claim 1, wherein the seat assembly includes a seat back.

4. The apparatus according to claim 1, wherein the seat assembly includes an armrest.

5. The apparatus according to claim 1, wherein the seat assembly includes a headrest.

6. The apparatus according to claim 1, wherein the seat assembly includes a serving tray.

7. The apparatus according to claim 1, wherein the seat assembly includes seat controls.

8. The apparatus according to claim 7, wherein the seat controls include seat recline control.

9. A wedge lock apparatus for securing a seat assembly to an aircraft having a seat track, the wedge lock apparatus comprising:
    (a) a selectively adjustable force applicator for applying force to the unattached end of a force bearer;
    (b) a bendable force bearer located between the seat track and the seat assembly including a plate for engaging the upper surface of the seat track, the plate including an attached end and an unattached end; and
    (c) a stud for matingly engaging the seat track connected to the seat assembly.

10. The apparatus according to claim 9 wherein the force applicator includes a rod.

11. The apparatus according to claim 10 wherein the rod includes threads.

12. The apparatus according to claim 11 wherein the threaded rod is a setscrew.

13. The apparatus according to claim 9 wherein the force bearer further includes a flexible pad adjacent to the plate.

14. The apparatus according to claim 9 further including a seat track for engaging the stud.

15. The apparatus according to claim 14 wherein the track includes a top, bottom, and at least one side defining a slot for retaining the stud.

16. The apparatus according to claim 15 wherein the top of the track includes opposing edges generally parallel to the sides of the track.

17. The apparatus according to claim 16 wherein the distance between the opposing edges changes along at least a portion of the track.

18. The apparatus according to claim 9 wherein the stud extends trackwardly from the seat assembly.

19. The apparatus according to claim 18 wherein the stud includes a head portion.

20. The apparatus according to claim 19 wherein the stud includes a collar portion.

21. The apparatus according to claim 20 wherein the head portion of the stud is larger than the collar portion of the stud measured transverse the trackward extension of the stud.

22. An improved seating apparatus for an aircraft having a seat track comprising:
    (a) a seat assembly; and
    (b) a wedge lock device for securing the seat assembly to the aircraft including:
        (i) a selectively adjustable force applicator for applying force to the unattached end of a force bearer;
        (ii) a bendable force bearer located between the seat track and the seat assembly including a plate for engaging the upper surface of the seat track the plate including an attached end and an unattached end; and
        (iii) a stud for matingly engaging the seat track connected to the seat assembly,
    whereby force applied to the force bearer by the force applicator is deflected to secure the seat assembly to the seat track.

23. The apparatus according to claim 22, wherein the seat assembly includes a seat back.

24. The apparatus according to claim 22, wherein the seat assembly includes an armrest.

25. The apparatus according to claim 22, wherein the seat assembly includes a headrest.

26. The apparatus according to claim 22, wherein the seat assembly includes a serving tray.

27. The apparatus according to claim 22, wherein the seat assembly includes seat controls.

28. The apparatus according to claim 27, wherein the seat controls include seat recline control.

29. The apparatus according to claim 22 wherein the force applicator includes a rod.

30. The apparatus according to claim 29 wherein the rod includes threads.

31. The apparatus according to claim 30 wherein the threaded rod is a setscrew.

32. The apparatus according to claim 22 wherein the force bearer further includes a flexible pad adjacent to the plate.

33. The apparatus according to claim 22 further including a seat track for engaging the stud.

34. The apparatus according to claim 33 wherein the track includes a top, bottom, and at least one side defining a slot for retaining the stud.

35. The apparatus according to claim 34 wherein the top of the track includes opposing edges generally parallel to the sides of the track.

36. The apparatus according to claim 35 wherein the distance between the opposing edges changes along at least a portion of the track.

37. The apparatus according to claim 22 wherein the stud extends trackwardly from the seat assembly.

38. The apparatus according to claim 37 wherein the stud includes a head portion.

39. The apparatus according to claim 38 wherein the stud includes a collar portion.

40. The apparatus according to claim 39 wherein the head portion of the stud is larger than the collar portion of the stud measured transverse the trackward extension of the stud.

* * * * *